H. L. GRAY.

METHOD FOR SEPARATING MUCILAGINOUS FROM NON-MUCILAGINOUS SEEDS.

APPLICATION FILED MAY 18, 1917.

1,279,377. Patented Sept. 17, 1918.

WITNESSES:

Walter V. Popp.

Lester L. Sargent

INVENTOR.

Harold L. Gray

BY

Jerry A. Mathews.

ATTORNEY.

H. L. GRAY.

METHOD FOR SEPARATING MUCILAGINOUS FROM NON-MUCILAGINOUS SEEDS.

APPLICATION FILED MAY 18, 1917.

1,279,377. Patented Sept. 17, 1918.

Inventor

Harold L. Gray

Witness

Walter H. Popp.

Lester L. Sargent

By Jerry A. Mathews

Attorney

H. L. GRAY.

METHOD FOR SEPARATING MUCILAGINOUS FROM NON-MUCILAGINOUS SEEDS.

APPLICATION FILED MAY 18, 1917.

1,279,377. Patented Sept. 17, 1918.

Harold L. Gray Inventor

Witness

Walter D. Popp.

Lester L. Sargent

By Jerry A. Mathews,

Attorney

H. L. GRAY.

METHOD FOR SEPARATING MUCILAGINOUS FROM NON-MUCILAGINOUS SEEDS.

APPLICATION FILED MAY 18, 1917.

1,279,377. Patented Sept. 17, 1918.

WITNESSES:

Walter H. Popp.

Lester L. Sargent

INVENTOR.

Harold L. Gray

BY

Jerry A. Mathews,

ATTORNEY.

UNITED STATES PATENT OFFICE.

HAROLD L. GRAY, OF CRAWFORDSVILLE, INDIANA, ASSIGNOR TO CRABBS REYNOLDS TAYLOR COMPANY, OF CRAWFORDSVILLE, INDIANA, A CORPORATION OF INDIANA.

METHOD OF SEPARATING MUCILAGINOUS FROM NON-MUCILAGINOUS SEEDS.

1,279,377. Specification of Letters Patent. Patented Sept. 17, 1918.

Application filed May 18, 1917. Serial No. 169,540.

*To all whom it may concern:*

Be it known that I, Harold L. Gray, a citizen of the United States, residing at Crawfordsville, in the county of Montgomery and State of Indiana, have invented new and useful Improvements in Methods for Separating Mucilaginous from Non-Mucilaginous Seeds, of which the following is a specification.

The object of my invention is to provide improvements in a method for separating useful grain seeds, such as clover seeds, from the seeds of noxious weeds such as buckhorn seed, which differ from clover seed in having a surface coating which becomes mucilaginous when moistened, and to which sawdust will adhere. It is an especial object of my invention to provide novel and improved method for moistening the seed, mixing it with the sawdust so that it will form a coating for the mucilaginous seed thereby producing a ball of larger size than the clover seed. With my new method and apparatus, the wet seed is thoroughly mixed first and given ample time for the water to set in the mucilaginous seed. It is then quickly dropped into hot sawdust and rapidly spread over an upper shaker shoe where it rolls over and over, the mucilaginous seed gathering into balls large enough to easily pass over screens with larger perforations, than has been possible with former methods.

It is further my object to provide a novel fanning arrangement utilizing an exhaust fan and a blower and a large sawdust collector. With the novel fanning construction which I have devised the separation of the sawdust from the seed is performed more effectively and the necessity for a second cleaning of the seed in a separate machine, which has heretofore been necessary, is now eliminated.

It is further my object to provide a novel construction and arrangement of shaker shoes and conveyers, which run more smoothly than the seed separating table heretofore used and make less noise and require less horse power.

It is further my object to provide a machine of novel construction so arranged as to greatly increase its capacity and permit of successful operation with less interference from unfavorable weather conditions.

It is an object of my invention to provide novel and improved means for drying the sawdust which is to be mixed with the seed.

It is further my object to provide a machine having a comparatively small number of parts, whereby to lessen the expense of construction and repairs.

With these and other objects in view, I provide the mechanism illustrated in the accompanying drawings, in which—

Like characters of reference designate like parts throughout the several views.

Figure 3:
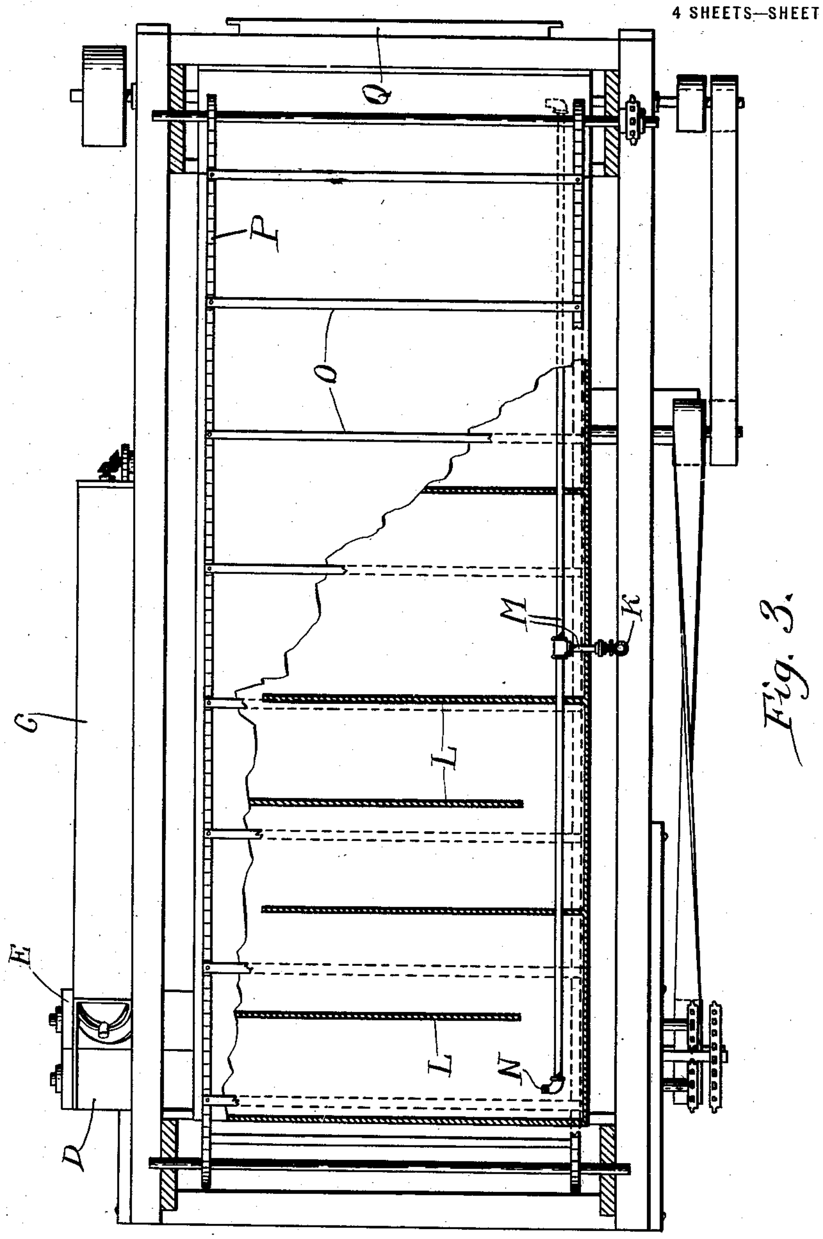
Fig. 3 is a horizontal section on line 3—3 of Fig. 2, a portion being broken away to show the arrangement of members L.

Referring to the accompanying drawings, I provide a pipe Q, through which the sawdust is blown to the dust collector R, from whence it is delivered to the pans A. There are a plurality of these pans arranged in superposed relation. I provide endless chains P which carry spaced cross bars O so disposed as to sweep over the pans as the endless chains are operated. I provide a steam pipe K through which steam is delivered to pipes M and thence through suitable nozzles N, whereby live steam is distributed over the pans A, diverting walls L being provided as shown in Fig. 3.

Figure 1:
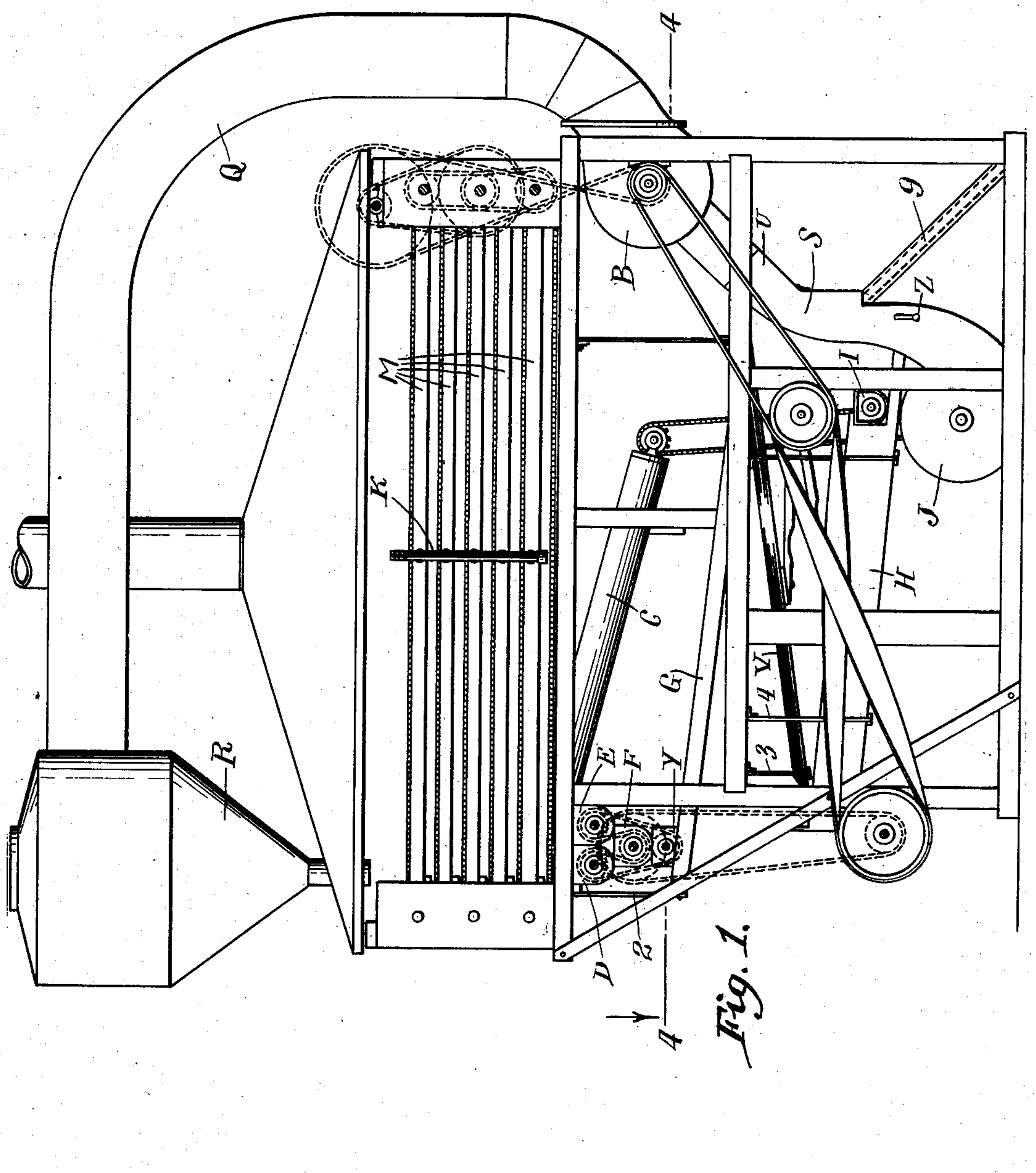
Figure 1 is a side elevation of the entire machine.
Figure 2:
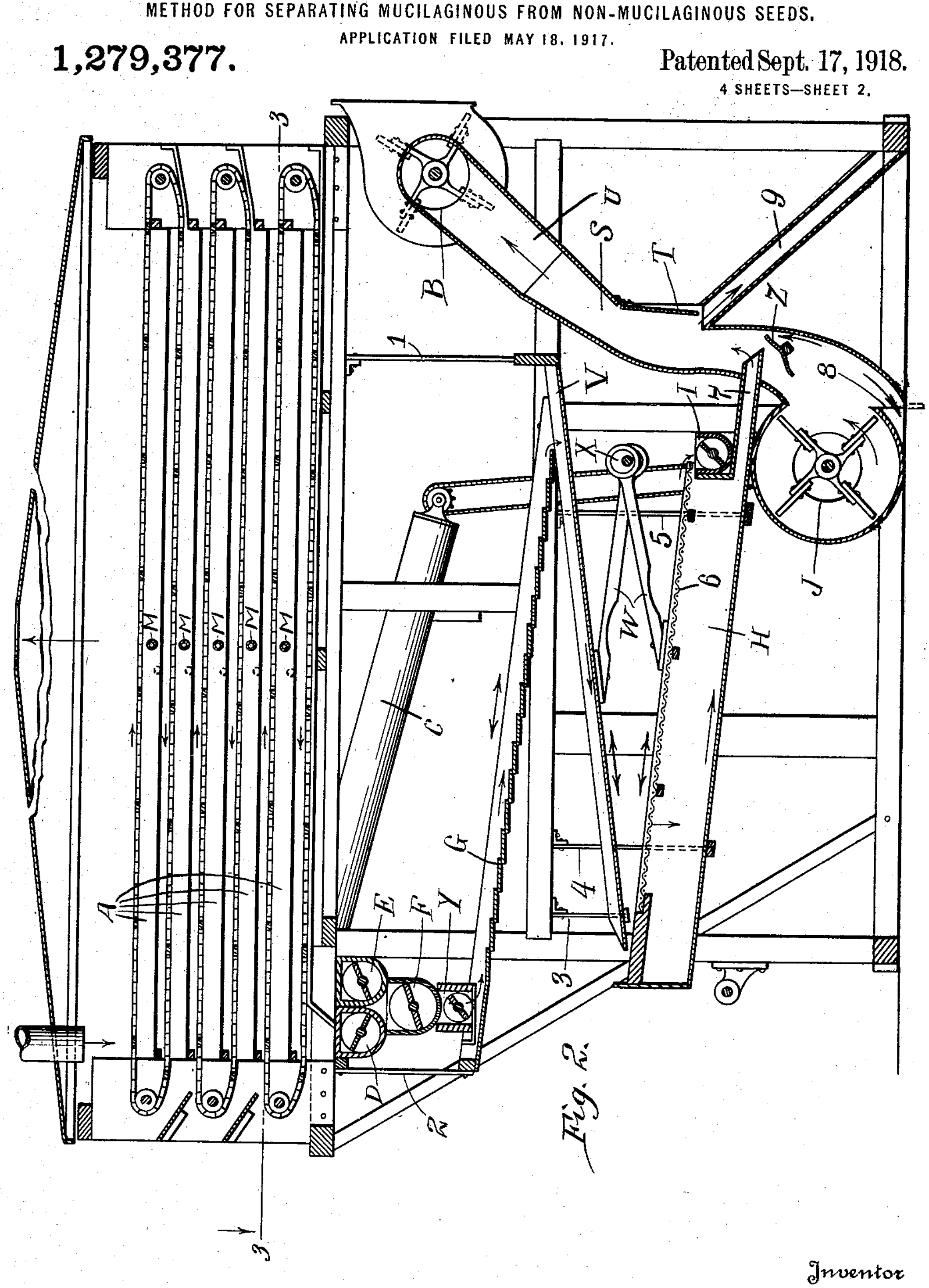
Fig. 2 is a vertical section of the entire machine.
Figure 4:
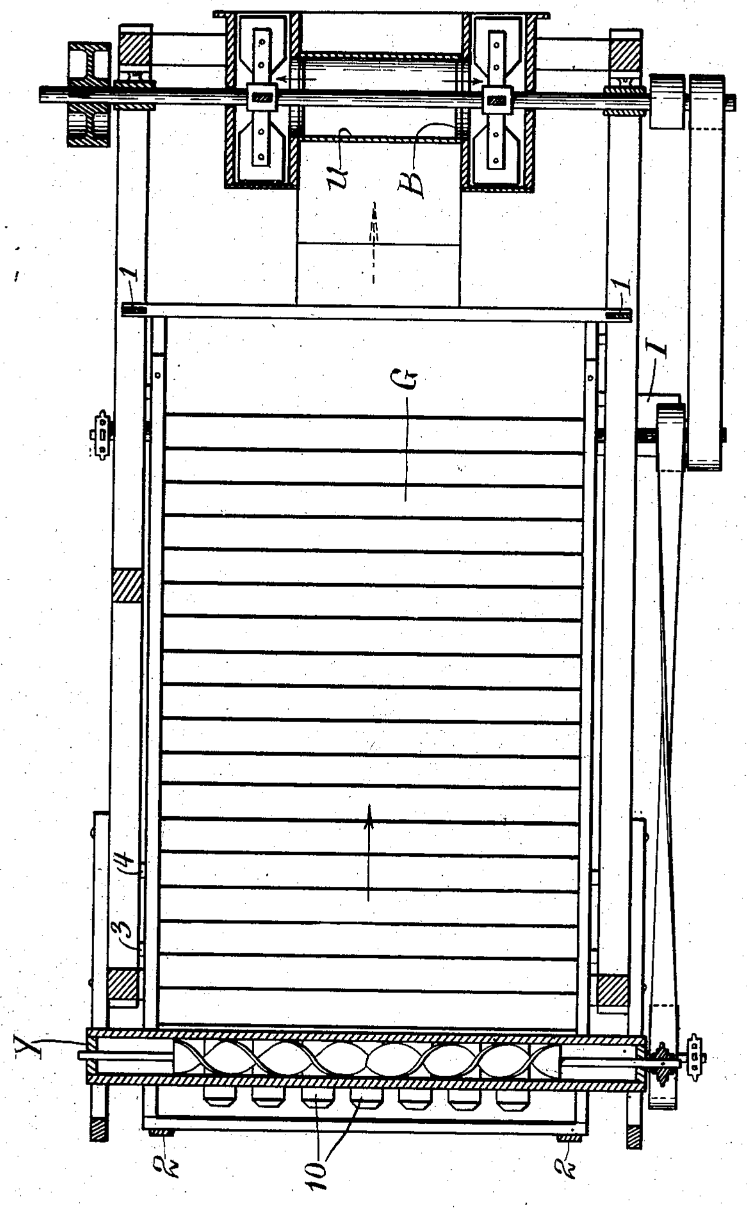
Fig. 4 is a horizontal section on line 4—4 of Fig. 1.

Members C, D, E, F, Y, and G, take the place of the separating table heretofore employed in seed separating machines of this type. The seed is fed into the open lower end of conveyer C and mixed with water at this point. Conveyer C is mounted at an incline or angle of about thirty degrees. It empties into conveyer E, which also is a spiral conveyer. The sawdust from the lowest of the pans is delivered to conveyer D, also a spiral conveyer by which it is carried to one end and delivered to conveyer F, the seed in conveyer E similarly being delivered to conveyer F. Seed and sawdust are mingled in conveyer F and from it are delivered to conveyer Y. Conveyer Y differs from conveyers C, D, E and F in being a two-way conveyer, as illustrated in Fig. 4. The sawdust and seed which by this time are well mixed are dropped onto a novel shaker pan G of stepped construction, as shown in Fig. 2. From pan G the seed and sawdust are gradually shaken down to inclined platform V. In passing over shaker

BEST AVAILABLE COPY

G, the mucilaginous seed gathers the sawdust about it so as to form small balls of considerably larger size than the clover seed. From member V the seed is delivered to a suitable grain shoe H. The seed which has collected the sawdust about it and is too large to pass through the screening 6 flows into a spiral conveyer 5, which carries it out of the machine. The smaller seed which is non-mucilaginous falls readily through the screen to the bottom of grain shoe H and flows through spout 7 into the pipe or conduit U. Members G and V are both supported by a flexible bar 1 at one end, while member G is supported by a flexible bar 2 at the other end and member V by a flexible bar 3, at the corresponding end which is the front of the machine. These members are suspended by flexible bars to permit of their being given a vibratory or shaking movement. Similarly, grain chute H is suspended from the frame of the machine by flexible bars 4 and 5. A vibratory movement to members G, V and H is communicated by eccentric rods W, preferably shaped as shown in Fig. 2, which are operated by eccentrics X, as illustrated in Fig. 2.

Referring to Fig. 2, there is illustrated novel means for separating the sawdust and seed and for returning the sawdust to the dust collector R and thence to the pans A where it is used over again. I provide a pipe U, at the lower end of which is a blower fan J driven at such speed as to force a current of air that will carry the sawdust and seed up the pipe to approximately the portion designated S. At this point the driving force of the bore is superseded by the suction from an exhaust fan B disposed in the upper portion of pipe U, as illustrated in the drawings. A suitable valve T is provided in pipe U immediately below the narrow portion S of pipe U, and just above a discharge chute 9 opening out of pipe U. I also provide a suitable valve or vane Z. Valves Z and T may be adjusted by any suitable means such as by projecting knobs or handles. The force of the current of air through pipe U is regulated so that the seeds of medium weight will be carried by the air current from the blower to a height sufficient so that they will fall back into discharge chute 9, whereas the sawdust, being lighter, is sucked up by the exhaust fan B and swept along to the dust collector R. A separation of the heavier material is effected by valve Z, said material dropping into member 8.

The operation of the machine has been described in connection with the foregoing explanation of its construction. By providing the series of superposed pans, the capacity of the machine has been greatly increased. The fact of using screens with larger perforations and the employment of my improved method of mingling the seed and sawdust has also made it possible to operate on a much larger quantity of seed than heretofore. The shaker shoes and conveyers which have taken the place of the table employed in former seed separating machines provide an important improvement in that they run twice as smoothly, with very little noise and require less horse power. The employment of the nozzle arrangement of a combined blower and exhaust fan makes it possible to effect a more complete and thorough separation of seed from sawdust. With the new method, the wet seed is thoroughly mixed first and given ample time for the water to set in the mucilaginous seed. It is then quickly dropped into hot sawdust and rapidly spread over the upper shaker platform where it rolls over and over from step to step downwardly. This enables the mucilaginous seed to collect about it a coating of sawdust so as to form balls large enough to easily pass over the screen which has larger perforations than has been possible with former machines, thus causing a more effective separation of the useful non-mucilaginous clover seed from the mucilaginous and undesirable buckhorn and other weed seeds.

What I claim is:

1. The method of separating mucilaginous seeds from non-mucilaginous seeds, consisting in mingling wet seeds and dry sawdust; thereafter agitating and conveying the material to cause a balling action of the mucilaginous seeds; and separating the non-mucilaginous seeds from the sawdust-balled mucilaginous seeds.

2. The method of separating mucilaginous seeds from non-mucilaginous seeds, consisting in mingling wet seeds and dry sawdust; delivering the mingled seeds and sawdust directly to agitating and conveying apparatus; agitating and conveying the material to cause a balling action of the mucilaginous seeds; and separating the non-mucilaginous seeds from the sawdust-balled mucilaginous seeds.

3. The method of separating seeds of the class described, consisting in heating absorbent material; wetting the seeds; conveying and mingling the wet seeds and hot absorbent material without exposure to the outside air; delivering the mingled seeds and sawdust directly to agitating and conveying apparatus to cause a balling action of the mucilaginous seeds, and separating the balled mucilaginous seeds from the non-mucilaginous seeds.

HAROLD L. GRAY.